US009506342B2

(12) United States Patent
Wang et al.

(10) Patent No.: US 9,506,342 B2
(45) Date of Patent: Nov. 29, 2016

(54) DOWNHOLE COMMUNICATIONS ARRANGEMENT AND DOWNHOLE SYSTEM

(71) Applicants: Ke Wang, Houston, TX (US); Zhiyue Xu, Cypress, TX (US); Michael H. Johnson, Katy, TX (US)

(72) Inventors: Ke Wang, Houston, TX (US); Zhiyue Xu, Cypress, TX (US); Michael H. Johnson, Katy, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 74 days.

(21) Appl. No.: 14/298,220

(22) Filed: Jun. 6, 2014

(65) Prior Publication Data

US 2015/0354348 A1 Dec. 10, 2015

(51) Int. Cl.
E21B 47/12 (2012.01)
G01V 3/30 (2006.01)

(52) U.S. Cl.
CPC .............. E21B 47/122 (2013.01); G01V 3/30 (2013.01)

(58) Field of Classification Search
CPC ............................... E21B 47/122; G01V 3/30
USPC .................................................. 324/338–339
See application file for complete search history.

(56) References Cited

U.S. PATENT DOCUMENTS

| 4,536,714 A | 8/1985 | Clark |
| 5,530,358 A | 6/1996 | Wisler et al. |
| 6,297,639 B1* | 10/2001 | Clark ..................... G01V 3/30 324/338 |
| 8,535,604 B1 | 9/2013 | Baker et al. |
| 2002/0008520 A1 | 1/2002 | Clark et al. |
| 2003/0155923 A1* | 8/2003 | Omeragic ............... G01V 3/28 324/338 |
| 2004/0108114 A1 | 6/2004 | Lerche et al. |
| 2009/0101352 A1 | 4/2009 | Coronado et al. |
| 2011/0135530 A1* | 6/2011 | Xu ......................... B22F 1/02 419/13 |

FOREIGN PATENT DOCUMENTS

| EP | 1103997 A3 | 3/2003 |
| EP | 2492437 A3 | 4/2013 |

OTHER PUBLICATIONS

Notification of Transmittal of the Written Opinion of the International Searching Authority; Korean Intellectual Property Office; PCT/US2015/028690; Mail Date Jul. 30, 2015: 7 pages.
Notification of Transmittal of the International Search Report; Korean Intellectual Property Office; PCT/US2015/028690; Mail Date Jul. 30, 2015: 4 pages.

* cited by examiner

Primary Examiner — Jay Patidar
(74) Attorney, Agent, or Firm — Cantor Colburn LLP

(57) ABSTRACT

A downhole communications arrangement including one or more electromagnetic (EM) devices; and a shield disposed relative to the one or more devices. The shield preventing or reducing passage of one or more EM frequencies and being alterable by one or more selected conditions to allow passage of the one or more frequencies. A method for communicating in a downhole environment.

20 Claims, 1 Drawing Sheet

DOWNHOLE COMMUNICATIONS ARRANGEMENT AND DOWNHOLE SYSTEM

BACKGROUND

In contemporary hydrocarbon exploration and recovery efforts, sensorial technology is more ubiquitous than ever. Traditional concept sensors and receivers have been used. Very important to successful downhole operations is effective receipt of information at decision making locations such as surface locations and controller locations. This is because modern downhole assemblies offer a number of refinements over those of the past in that undesirable occurrences downhole can be managed rapidly and in some cases even while a well is on production. Making such capabilities most efficient requires rapid and reliable communication from a sensory function to a command function. It will be recognized that there are a number of systems already available to sensing and transmitting information, for example, optic fiber based systems, electrical systems, etc. that sense selected parameters and transmit the information to a control center. Such systems however are relatively expensive and unflexible in their application. In view of the everchanging and consistently increasing number of downhole conditions and system configurations however, the art is continually receptive to new ways to support the ultimate goal of increased production at lower overall cost.

BRIEF DESCRIPTION

A downhole communications arrangement includes one or more electromagnetic (EM) devices; and a shield disposed relative to the one or more devices, the shield preventing or reducing passage of one or more EM frequencies and being alterable by one or more selected conditions to allow passage of the one or more frequencies.

A downhole system includes a borehole; one or more electromagnetic (EM) devices; and a shield disposed relative to the one or more devices, the shield preventing or reducing passage of one or more EM frequencies and being alterable by one or more selected conditions to allow passage of the one or more frequencies.

A method for communicating in a downhole environment includes shielding one or more EM devices with an alterable shield that prior to alteration prevents or reduces passage of one or more selected frequencies; positioning the shielded one or more EM devices in a downhole environment; exposing the shield to a selected condition; altering the shield in response to the selected condition to allow passage of the one or more frequencies.

DETAILED DESCRIPTION

Figure 1:
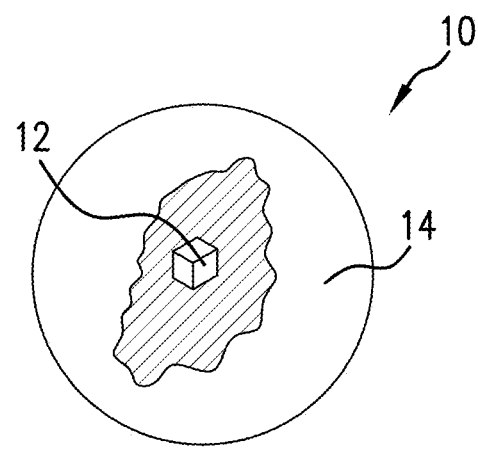
FIG. 1 is a schematic illustration of a mobile member comprising an electromagnetic (EM) shield and housing an EM device.

Referring to FIG. 1, a broad concept of the invention herein described is illustrated. The arrangement 10 includes one or more electromagnetic (EM) device(s) 12 each of which may be configured as a transmitter, a receiver, a transceiver or a reflector and a shield 14 that inhibits passage of at least one frequency of one or more frequencies that one or more EM device(s) use. Hereinafter "EM device" or "device" in the singular is intended to encompass the one or more devices disclosed above. The shield is configured to be alterable by one or more selected conditions in the downhole environment to allow passage of the one or more frequencies. The shield may completely envelop the EM device, as in FIG. 1, or may merely represent a small portion of a structure 16 (see FIG. 2) that envelopes the EM device 12. In the event that the shield 14 itself does not envelope the EM device 12, the structure 16 that does envelop the balance of the device is itself impervious to EM radiation or at least to the EM radiation frequency or frequencies that the EM device 12 uses. This ensures the most basic concept disclosed herein in that EM communication between the EM device 12 and an environment beyond the shield 14 will occur only after the shield 14 is exposed to a selected condition for a requisite period of time. As such, the structure 16 may be constructed of metal or other material having the property noted and sufficient structural integrity for the intended duty. For example, if the intended duty of the arrangement is initially a tripping ball, the structure 16 and/or shield 14 would need to have sufficient structural integrity to manage a selected pressure differential across a seat that is part of the overall system. It is however cautioned that the recitation of a tripping ball is exemplary only as the arrangement disclosed herein is suitable for use in many configurations and many sizes. The arrangement may for example be constructed to be extremely small, such as the size of the head of a pin so that it may easily be deposited into an annulus of a borehole. The size and shape may be configured to anything that suits a particular purpose for the borehole such as falling to the bottom of the hole without interacting with other components, or seating in a seat, or made to cause components to take action mechanically on the way down (or with reverse circulation up) the borehole, or to cause actions to occur through the communication with the EM device in the arrangement through the action of the selected condition that causes such communication to be possible, etc. It is also within the scope of the invention to fix the arrangement in place downhole by mechanical, chemical of fusion means or by effectively building the arrangement into another component part of the downhole structure, the affixation being before running or after running. The number of arrangements used depends upon purpose, interest and cost considerations. There may be one or many and their placements can be anywhere desired and in any pattern. In one example, a number of arrangements might be placed annularly in a horizontal section of a borehole to provide information about what level water might be braking through based upon how many of the annularly placed arrangements are altered such that their signal can be detected.

The EM device 12 as noted above may be configured as a transmitter, a receiver, a transmitter or a reflector (such as an unpowered radio frequency identification "RFID" device). The device may be configured to operate at one frequency or at a number of frequencies. In one iteration, the device 12 will be set to begin transmitting its one or more frequencies at the time of its construction and continue to do so for as long as an on board energy source lasts. The signal would be contained by the shield until the shield is compromised due to the action of a selected condition downhole. That condition may be pressure (natural or induced), water, brine, oil, acid, or any other mechanical and/or chemical whether naturally occurring or released into the borehole for the purpose of degrading or compromising the integrity of the shield, after which the signal will be receivable by a receiver positioned elsewhere (locally in the borehole or outside of the borehole depending upon design point). In another iteration, the device 12 might be configured to conserve on board power by not transmitting its one or more frequencies until an activating signal is received. In such as embodiment, an activating signal would be provided from elsewhere and if the selected condition occurred (such as water breakthrough) the shield would become compromised and the existing signal would reach the device 12 thereby triggering its one of more frequencies such that a signal indicative of whatever the shield is configured to react to has occurred. Due to the potential number of frequencies and arrangements downhole, the frequency received by a sensor will tell an operator where the selected condition occurred. In yet another iteration, the device 12 may be configured to receive one or more frequencies and send another one or more frequencies for various communication requirements. It is to be understood that the one or more frequencies broadcast by the device 12 may be used for, for example: simple communication of the occurrence of a selected condition downhole; or as a triggering signal for another device to actuate, for example the frequency might be used to actuate an e-trigger that then causes a sleeve to close due to water breakthrough at that location. In another iteration, the device 12 may be configured as a sensor with a timer that auto starts upon receipt of the selected signal such that when the device is retrieved at surface through circulation or reverse circulation, a time stamp can be used to tell the operator when the selected condition downhole occurred and with flow rates, the position can be accurately estimated.

Figure 2:
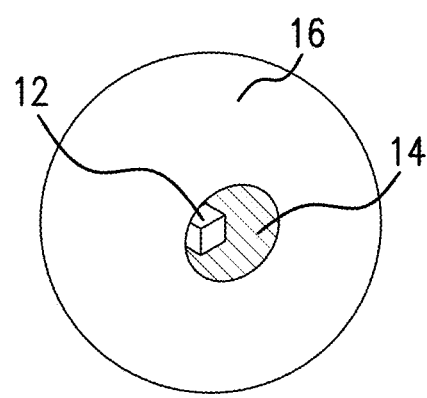
FIG. 2 is a schematic illustration of an alternate mobile member comprising an electromagnetic (EM) shield and housing an EM device.
Figure 3:
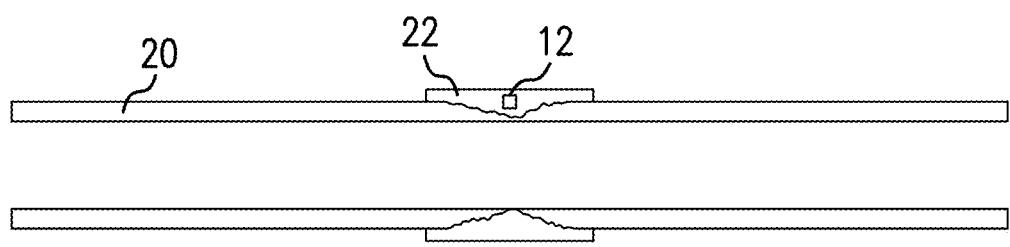
FIG. 3 is a schematic illustration of a section of a borehole with a fixed position downhole communications system disposed therein.

Referring to FIGS. 1 and 2 (a plug and part of a plug respectively and schematically represented for any possible shape or configuration whether independent of other structure or connected to another structure such as a component of a downhole string 20 or tool 22 see FIG. 3) simultaneously to illustrate possible configurations of the alterable shield, it will be appreciated that the whole of the arrangement but for the device 12 may be the shield wherein the material used may be controlled electrolytic material, other dissolvable disintegratable corrodible or otherwise disappearing material providing it has the ability to prevent or reduce passage of the relevant one or more frequencies. Alternately, the shield 14 may be a material that is responsive to pressure in a way that will alter its ability to prevent or reduce passage of the one or more frequencies. More specifically, the material may comprise a burst disk or an entire structure that will fragment upon application of pressure. Selected materials include controlled electrolytic materials available from Baker Hughes Incorporated under the trade name IN-Tallic™ disclosed in U.S. Pat. Nos. 8,297,364, 8,327,931, 8,403,037 and 8,528,633 and US publications 2011/0132143, 2011/0135953, 2011/0135530 and 2011/0136707 all of which are fully incorporated herein by reference. In another configuration shown schematically in FIG. 2, only part of the structure of the arrangement is the shield 14 and that shield may comprise any of the materials listed. Any of the functions noted above are attainable with either of the illustrated configurations and any other configuration that achieves the basic premise that EM communication with the device is prevented or reduced initially and responsive to a selected condition become possible through the alteration of the shield.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A downhole communications arrangement comprising:
one or more electromagnetic (EM) devices; and
a shield disposed relative to the one or more devices, the shield preventing or reducing passage of one or more EM frequencies and being alterable during use by one or more selected environmental conditions to allow passage of the one or more frequencies within a selected time.

2. The downhole communication arrangement as claimed in claim 1 wherein the one or more EM devices is a transmitter.

3. The downhole communication arrangement as claimed in claim 1 wherein the one or more EM devices is a receiver.

4. The downhole communication arrangement as claimed in claim 1 wherein the one or more EM devices is a transceiver.

5. The downhole communication arrangement as claimed in claim 1 wherein the one or more EM devices utilize only one frequency.

6. The downhole communication arrangement as claimed in claim 1 wherein the one or more EM devices transmits a signal at one or more frequencies after receiving a trigger.

7. The downhole communication arrangement as claimed in claim 6 wherein the trigger is one or more signals received by the one or more EM devices at one or more frequencies.

8. The downhole communication arrangement as claimed in claim 7 wherein the trigger is at one or more frequencies at least including one different frequency than the one or more frequencies at which the one or more EM devices transmits after receiving the trigger.

9. The downhole communication arrangement as claimed in claim 1 wherein the shield is mechanically alterable.

10. The downhole communication arrangement as claimed in claim 1 wherein the shield is a controlled electrolytic metallic material.

11. The downhole communication arrangement as claimed in claim 1 wherein the shield surrounds the one or more EM devices.

12. The downhole communication arrangement as claimed in claim 1 wherein the arrangement includes a structure containing the one or more EM devices and the shield is disposed at an otherwise frequency transparent passageway in the structure to the one or more EM devices.

13. The downhole communication arrangement as claimed in claim 12 wherein the shield is configured as a burst disk.

14. The downhole communication arrangement as claimed in claim 1 wherein the shield is embodied in a plug.

15. The downhole communication arrangement as claimed in claim 14 wherein the shield comprises part of the plug.

16. The downhole communication arrangement as claimed in claim 1 wherein the one or more EM devices and shield are fixedly positioned in a downhole string.

17. A downhole communications arrangement comprising:
   one or more electromagnetic (EM) devices; and
      a shield disposed relative to the one or more devices, the shield preventing or reducing passage of one or more EM frequencies and being alterable by one or more selected conditions to allow passage of the one or more frequencies wherein the shield is electrochemically alterable.

18. A downhole communications arrangement comprising:
   one or more electromagnetic (EM) devices; and
      a shield disposed relative to the one or more devices, the shield preventing or reducing passage of one or more EM frequencies and being alterable by one or more selected conditions to allow passage of the one or more frequencies, the arrangement including a structure containing the one or more EM devices and the shield being disposed at an otherwise frequency transparent passageway in the structure to the one or more EM devices
wherein the shield is electrochemically alterable.

19. A downhole system comprising:
   a borehole;
   one or more electromagnetic (EM) devices; and
      a shield disposed relative to the one or more devices, the shield preventing or reducing passage of one or more EM frequencies and being alterable during use by one or more selected environmental conditions to allow passage of the one or more frequencies within a selected time.

20. A method for communicating in a downhole environment comprising:
   shielding one or more EM devices with an alterable shield that prior to alteration prevents or reduces passage of one or more selected frequencies;
   positioning the shielded one or more EM devices in a downhole environment;
   exposing the shield to a selected environmental condition;
   altering the shield in response to the selected environmental condition to allow passage of the one or more frequencies within a selected time.

* * * * *